United States Patent [19]

Lamoni

[11] Patent Number: 4,997,485

[45] Date of Patent: Mar. 5, 1991

[54] AGGREGATE FOR CONCRETE OR A SIMILAR BUILDING MATERIAL AND A METHOD OF PRODUCING SUCH AGGREGATE

[76] Inventor: Patrick Lamoni, Via Cattedrale 14, 6900 Lugano, Switzerland

[21] Appl. No.: 406,457

[22] Filed: Sep. 13, 1989

[30] Foreign Application Priority Data

Sep. 14, 1988 [CH] Switzerland .......................... 3428/88

[51] Int. Cl.$^5$ ........................ C04B 20/02; C04B 18/16
[52] U.S. Cl. ..................................... 106/753; 65/21.1; 65/21.3; 65/21.5; 51/313; 51/283 R
[58] Field of Search .......................... 106/90, 101, 676; 65/21.1, 21.3, 61; 51/313, 283 R, 283 E

[56] References Cited

U.S. PATENT DOCUMENTS

| 3,864,443 | 2/1975 | Hopkins | 264/42 |
| 4,019,919 | 4/1977 | Desacuo | 106/90 |
| 4,398,960 | 8/1983 | Murray | 106/97 |

FOREIGN PATENT DOCUMENTS

| 2006783 | 3/1974 | U.S.S.R. | 106/90 |
| 1466559 | 3/1977 | United Kingdom | 106/90 |

Primary Examiner—William R. Dixon, Jr.
Assistant Examiner—Alan Wright
Attorney, Agent, or Firm—Ladas & Parry

[57] ABSTRACT

An aggregate is produced from waste glass which is initially crushed to a granular state and is thereafter roughened at its surfaces and rounded at its edges. This result is obtained by a grinding treatment. The aggregate can be used for concrete. It allows an excellent adhering of the cement and it gives practically no rise to the danger of injury during the handling thereof.

2 Claims, No Drawings

AGGREGATE FOR CONCRETE OR A SIMILAR BUILDING MATERIAL AND A METHOD OF PRODUCING SUCH AGGREGATE

FIELD OF THE INVENTION

The present invention relates to an aggregate for building material mixtures, which aggregate is produced of waste glass which has been crushed and/or ground to granules. The invention relates further to a method of producing an aggregate for building material mixtures, which aggregate is produced of waste glass which has been crushed and/or ground to granules having roughened surfaces and rounded edges. The invention also relates to a concrete article of manufacture including an aggregate produced of waste glass.

DESCRIPTION OF THE PRIOR ART

In the building industry aggregates are used for a wide range of applications, specifically obviously for the producing of concrete but also for producing other hydraulically bound mixtures, for producing mortar and also mixtures for road construction and foundations.

The German published patent application DE-OS 1 939 714 discloses an aggregate which consists of ground or crushed, respectively, waste glass. Although this aggregate features the advantage that it is available at many locations and can be quite easily produced in jaw crushers and pan grinders, such aggregate is bestowed with numerous drawbacks regarding its use, which drawbacks have prevented a widespread use thereof although the amount of collected waste glass thereof increases steadily. Specifically the adhering of the cement at the smooth glass surfaces of the granules is not as good as is the case with the commonly known aggregates, such as gravel sand, crushed rock, stone chips, pumice, etc. This could lead to poorer qualities of the building material produced with such aggregate, for instance, unsuitable concrete quality. The known aggregate produced from waste glass features, furthermore, sharp edges which also does not promote the adhering of the cement and forms, furthermore, specifically a considerable danger of injury for persons handling such material. This danger of injury from the extremely sharp edges of the glass is encountered at the transporting of the aggregate as well as during the handling thereof at the building site during the preparing of the concrete.

SUMMARY OF THE INVENTION

It is, therefore, a general object of the invention to provide an aggregate for building materials which allows an improved adhering of cement on its surfaces and does not give rise to the danger of injuries.

A further object of the invention is to provide an aggregate for building materials which comprises waste glass granules having roughened surfaces and rounded edges.

Yet a further object is to provide a method of producing an aggregate for building material mixtures which includes the steps of crushing or grinding waste glass to produce crushed or ground granules and of roughening the surfaces and rounding the edges of the granules by a mechanical grinding operation and/or a chemical etching operation.

Still a further object is to provide a method of producing an aggregate for building material mixtures which comprises the step of feeding the granules together with water and quartz sand into a rotating drum to perform the mechanical grinding of the glass granules.

A further object is to provide a method of producing an aggregate for building material mixtures which comprises the step of treating the granules by hydrofluoric acid to perform the chemical etching.

DESCRIPTION OF THE PREFERRED EMBODIMENT

The collecting of waste glass and its initial treatment by crushing and grinding is made in accordance with known techniques. Quite obviously it is not necessary when using such waste glass as aggregate to separate the variously colored glass pieces. The grain size is set preferably such that the granules of the waste glass are in the range of the mesh size generally used for such aggregates, for instance in case of concrete within the known mesh size values $A_{32}$ and $B_{32}$. Following the known crushing and/or grinding of the waste glass it is subjected to a further grinding and etching treatment. In order to grind the granules a rotating drum can be used, in which the glass granules are ground together with an addition of a grinding agent, preferably quartz sand and possibly water. This grinding treatment leads to two features: on the one hand the smooth glass surfaces of the granules or pieces, respectively, of the waste glass are roughened, and on the other hand the sharp edges are rounded, whereby the term rounding shall not be understood to be confined to a perfect roundness but rather a rounding in the sense that the granules or pieces, respectively, no longer have sharp edges. After this treatment or possibly prior to this treatment the known screening or sifting, respectively, of the desired grain size can be made.

Such a roughened and rounded aggregate incorporates all advantages of a glass aggregate: It has no organic contaminants, its weight is smaller than most of the known aggregates, it has a large compressive strength, a relatively high elasticity and remains waterproof. The inventive aggregate features an excellent adhering of cement or other binding agents and in contrast to known aggregates made of glass it gives practically no rise to the danger of injury.

This aggregate is specifically suitable for any kind of concrete, such as light concrete, normal concrete and heavy concrete. The aggregate is inert and is suitable for use with all binding agents, i.e. hydraulic binding agents and air binding agents. Any kind of materials which are commonly added to concrete, such as concrete liquefiers, agents for forming air pores in the concrete, sealing agents, agents for a retardation of the setting of concrete as well as the known aggregates or ballasts or addition materials, such as coloring agents, can be used with the inventive aggregate without any special measures.

In addition to the application together with concrete the aggregate can be used also for mortar or for base coffers or other known applications of aggregates.

Since many modifications, variations and changes in detail may be made to the described embodiment, it is intended that all matter contained in the foregoing description be interpreted as illustrative and not in a limiting sense.

I claim:

1. A method of producing aggregates for building material mixtures, comprising
providing solid crushed or ground glass granules of a mesh size of between $A_{32}$ and $B_{32}$, said granules having smooth surfaces and sharp cutting edges,
feeding said granules together with water and quartz sand into a rotating drum,
and grinding said granules in said drum over a period of time (1) to roughen the surface of the granules to enable the granules to adhere with binding agents of a building material mixture, and (2) to round off and remove the sharp cutting edges of the granules so that they no longer pose danger as cutting edges.

2. A concrete article of manufacture obtained by the method of claim 6, comprising an aggregate produced of waste glass which has been crushed or ground to granules, which granules feature roughened surfaces and rounded edges.

* * * * *